(12) United States Patent
Nakajima et al.

(10) Patent No.: US 10,511,823 B2
(45) Date of Patent: Dec. 17, 2019

(54) VIDEO DISPLAY APPARATUS, VIDEO DISPLAY SYSTEM, AND VIDEO DISPLAY METHOD

(71) Applicant: MAXELL, LTD., Kyoto (JP)

(72) Inventors: Mitsuo Nakajima, Tokyo (JP);
Nobuhiro Fukuda, Tokyo (JP);
Kazuhiko Tanaka, Tokyo (JP);
Nobuaki Kabuto, Tokyo (JP)

(73) Assignee: MAXELL, LTD., Kyoto (JP)

( * ) Notice: Subject to any disclaimer, the term of this patent is extended or adjusted under 35 U.S.C. 154(b) by 56 days.

(21) Appl. No.: 15/533,863

(22) PCT Filed: Sep. 17, 2015

(86) PCT No.: PCT/JP2015/076541
§ 371 (c)(1),
(2) Date: Jun. 7, 2017

(87) PCT Pub. No.: WO2016/098411
PCT Pub. Date: Jun. 23, 2016

(65) Prior Publication Data
US 2017/0324944 A1 Nov. 9, 2017

(30) Foreign Application Priority Data
Dec. 17, 2014 (JP) .............................. 2014-255166

(51) Int. Cl.
*H04N 13/128* (2018.01)
*H04N 9/31* (2006.01)
(Continued)

(52) U.S. Cl.
CPC .......... *H04N 13/128* (2018.05); *G09G 3/001* (2013.01); *G09G 3/20* (2013.01); *G09G 5/00* (2013.01);
(Continued)

(58) Field of Classification Search
CPC combination set(s) only.
See application file for complete search history.

(56) References Cited

U.S. PATENT DOCUMENTS

2004/0036717 A1* 2/2004 Kjeldsen ................ G03B 21/28
715/730
2009/0263044 A1* 10/2009 Imagawa .............. G06T 3/0087
382/275

(Continued)

FOREIGN PATENT DOCUMENTS

JP   H07-013497 A   1/1995
JP   2004-056335 A   2/2004
(Continued)

OTHER PUBLICATIONS

International Search Report for WO 2016/098411 A1, dated Dec. 22, 2015.

*Primary Examiner* — Alexander Gee
(74) *Attorney, Agent, or Firm* — Volpe and Koenig, P.C.

(57) ABSTRACT

Even when a watching position or a watching direction of a viewer for a video changes, video display with favorable visibility is obtained. A video display apparatus that receives an input of a video input signal and that displays a video based on the video input signal includes a viewer detection unit that detects a positional relation between a screen on which the video is displayed and a viewer who watches the video and that generates viewer position information including the detection result, an image processing unit that executes image correction processing for a correction region which is such a partial region of an image based on the video input signal as being set in correspondence with viewer position information, and a video display unit that displays, on the screen, a video based on a corrected video signal having been subjected to the image correction processing.

13 Claims, 14 Drawing Sheets

(51) Int. Cl.
  *H04N 13/363* (2018.01)
  *G09G 5/00* (2006.01)
  *G09G 3/20* (2006.01)
  *G09G 3/00* (2006.01)
  *H04N 13/398* (2018.01)
  *H04N 13/383* (2018.01)
  *H04N 7/01* (2006.01)
  *H04N 5/57* (2006.01)
  *G09G 5/36* (2006.01)

(52) U.S. Cl.
  CPC ............... *G09G 5/006* (2013.01); *G09G 5/36* (2013.01); *H04N 5/57* (2013.01); *H04N 7/0117* (2013.01); *H04N 7/0125* (2013.01); *H04N 9/3185* (2013.01); *H04N 9/3194* (2013.01); *H04N 13/363* (2018.05); *H04N 13/383* (2018.05); *H04N 13/398* (2018.05); *G09G 2340/02* (2013.01); *G09G 2354/00* (2013.01); *G09G 2370/022* (2013.01)

(56) References Cited

U.S. PATENT DOCUMENTS

2015/0177906 A1\* 6/2015 Yairi ..................... G06T 3/0006
 345/648
2015/0264298 A1\* 9/2015 Colenbrander ........ H04N 7/013
 345/547

FOREIGN PATENT DOCUMENTS

| JP | 2008-268327 A | 11/2008 |
| JP | 2010-153983 A | 7/2010 |
| WO | 2012/077601 A1 | 6/2012 |

\* cited by examiner (a)

(b)

(c)

(a)

(b)

(a)

(b)

VIDEO DISPLAY APPARATUS, VIDEO DISPLAY SYSTEM, AND VIDEO DISPLAY METHOD

TECHNICAL FIELD

The present invention relates to a technique of performing image correction processing for a video signal and displaying an image.

BACKGROUND ART

In recent years, performances of a video display apparatus have been improved such as high definition and high luminance, and a large-scale video display apparatus typified by a projection mapping has appeared on the market. In such an immersive display apparatus, a high sense of immersion is achieved by displaying a video in the entire human visual field. Meanwhile, the human visual field spreads out in a horizontal direction and a vertical direction, and generally includes a watching region (central visual field) and another region (peripheral visual field). While the human can recognize a fine video in the central visual field, the human cannot recognize the fine video in the peripheral visual field. That is, the human visual field has characteristics of a higher spatial resolution for the video as being closer to the central visual field. As a background technique of a video display apparatus using such human visual characteristics, Patent Document 1 is cited. This publication document describes that "the apparatus includes a video presentation unit configured to present a video, a video projection unit configured to project a video in order to present the video to the video presentation unit, and a driving unit configured to change the positions of the video presentation unit and the video projection unit, the video projection unit changes a video in a predetermined region including a watching point of an observer among pieces of the video presented to the video presentation unit, into a high-resolution video, and the driving unit changes the positions so as to substantially match a size of an object in the high-resolution video with a size of the object in the video in the predetermined region (excerpted from Abstract)."

RELATED ART DOCUMENT

Patent Document

Patent Document 1: Japanese Patent Application Laid-open Publication No. 2010-153983

SUMMARY OF THE INVENTION

Problems to be Solved by the Invention

The above-described Patent Document 1 describes achievement of high resolution of a video in accordance with the watching point of the observer, but does not describe a positional relation between the observer and a unit (screen) on which the video is displayed and not describe a distance between them. In the human visual characteristics, it is generally said that a portion which especially has a high spatial resolution in the central visual field is within a range of several degrees of the visual field centered on the watching point. For this reason, the range of the high spatial resolution, i.e., a region of the same on the screen, changes depending on the distance from the screen to the observer. The above-described related art document does not describe the distance between the screen and the observer in processing for video display control.

Meanwhile, when it is attempted that the high resolution is achieved on the entire screen, a load for image processing increases, and a data amount of the video signal increases, and therefore, these facts are not preferable for data transfer. As described above, there is still room for further improvement in preventing the increase in the data amount while achieving the high resolution.

The present invention has been made in consideration of the above-described circumstances, and an object of the present invention is to provide a technique of improving an image quality in consideration of the increase in the data amount.

Means for Solving the Problems

In order to solve the above-described problems, in the present invention, when receiving an input of a video input signal and displaying a video based on the video input signal, the positional relation between a display screen on which the video is displayed and a viewer who watches the video is detected, a partial region which corresponds to the positional relation in the image based on the video input signal is set as a correction region, image correction processing is executed for the correction region, and the video based on the video input signal according to the image which has been subjected to the image correction processing is displayed on the display screen.

Effects of the Invention

The present invention can provide a technique of improving an image quality while considering an increase in a data amount. Note that problems, configurations, and effects other than those described above will be apparent from the following description of embodiments.

BRIEF DESCRIPTIONS OF THE DRAWINGS

Figure 18:
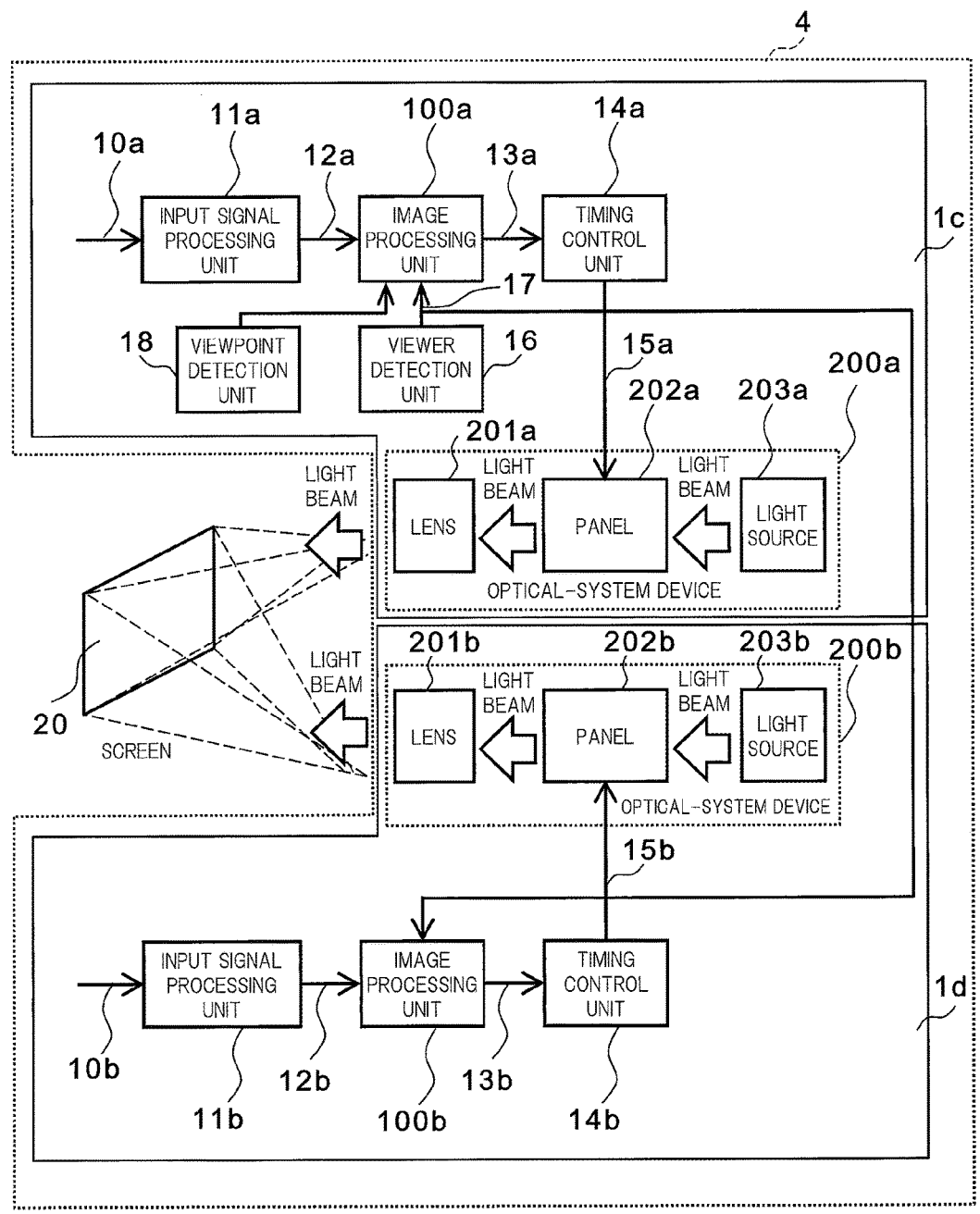
Figure 19:
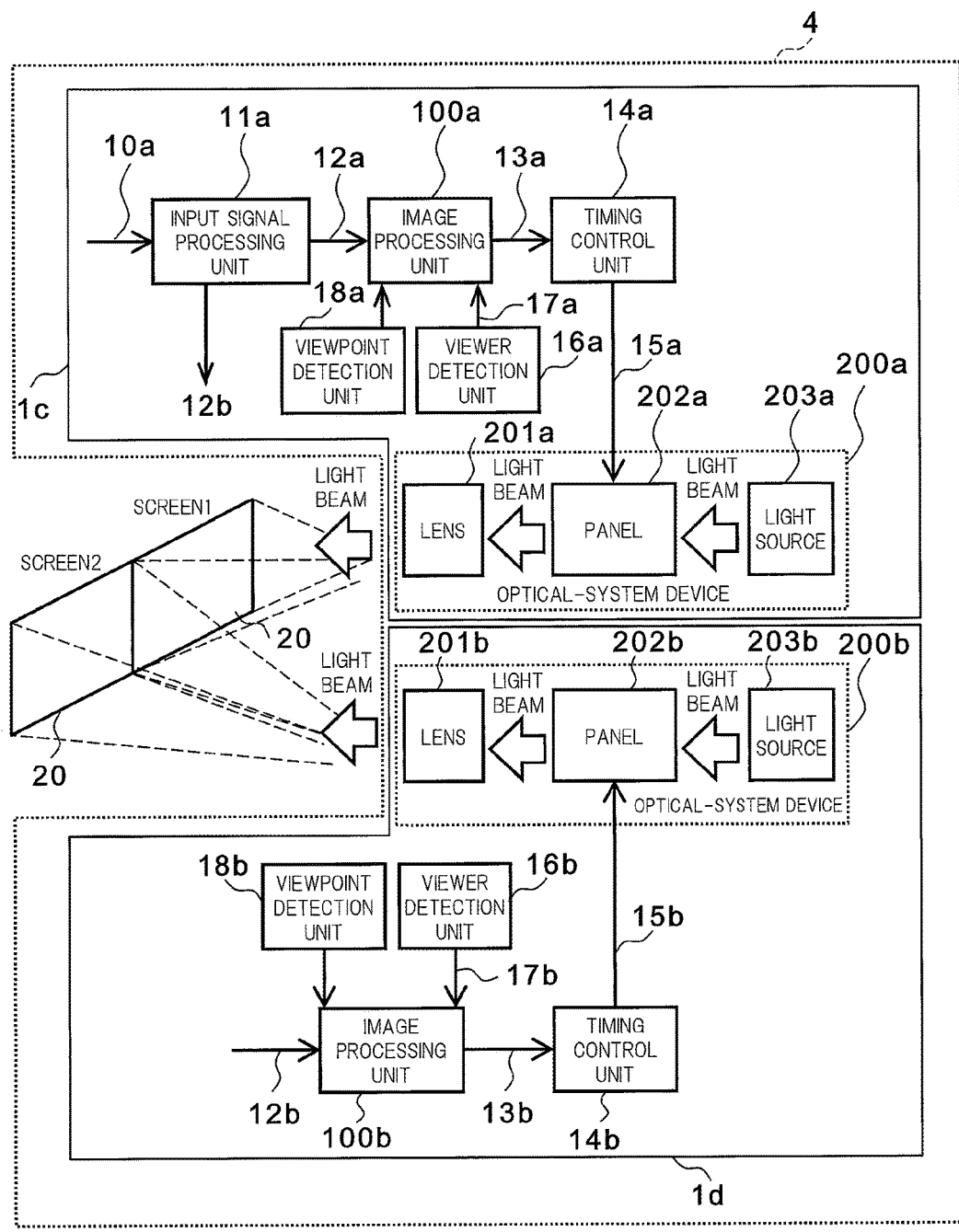

FIG. 18 is a diagram showing a schematic configuration of a video display system according to the sixth embodiment, which shows a configuration example in a case of overlapping projection on the same screen; and FIG. 19 is a diagram showing a schematic configuration of a video display system according to the sixth embodiment, which shows a configuration example in a case of overlapping projection on the same screen.

BEST MODE FOR CARRYING OUT THE INVENTION

Hereinafter, embodiments of the present invention will be described based on the accompanying drawings. Note that the same components are denoted by the same reference symbols throughout each drawing for describing the embodiments, and the repetitive description thereof will be omitted.

First Embodiment

As a configuration of a projector, the first embodiment will explain a video display apparatus which displays a display video while correcting it based on a positional relation between a video display position and a viewer. Although the following explanation is about an example of a front projector, note that an aspect of the projector may be a rear projection television. In addition, this apparatus may be a display apparatus using a direct-view flat-panel display such as a liquid crystal display, a plasma display, or an organic EL display which does not perform magnified projection on the panel. Furthermore, the video display apparatus is not limited to the projector but can take any aspect as long as being an apparatus which projects and outputs video signals such as a television set or a game machine. This point is similar in any following embodiment.

Figure 1:
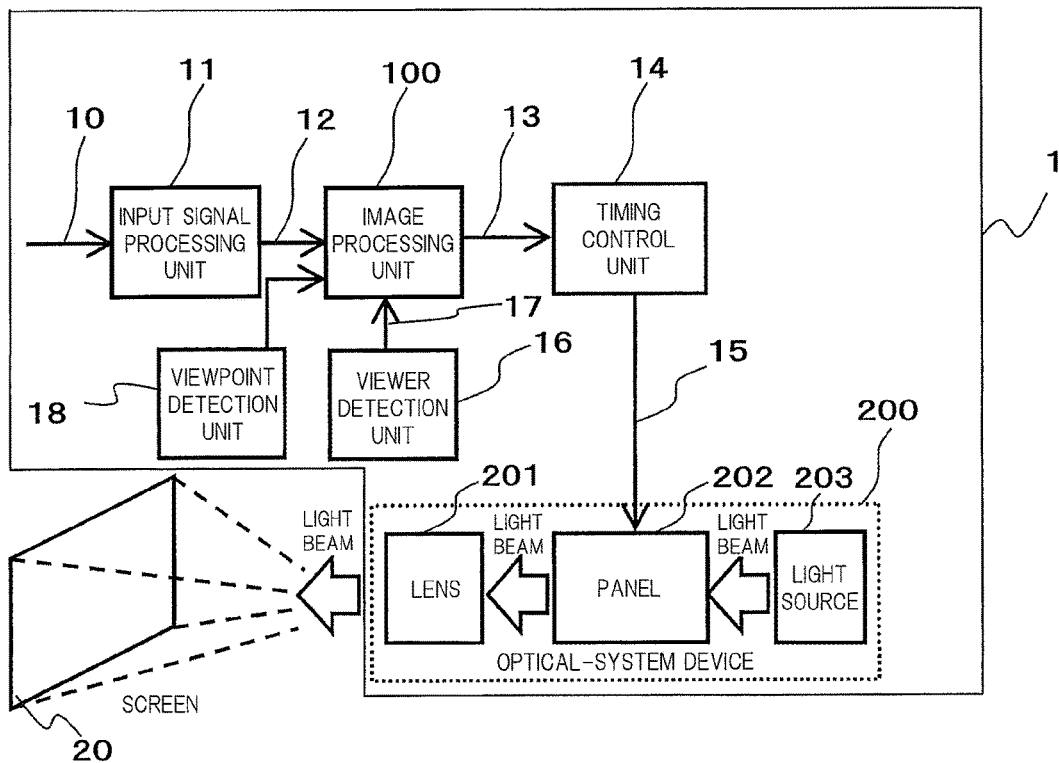
FIG. 1 is a block diagram showing a schematic configuration of a video display apparatus according to the first embodiment.
Figure 2:
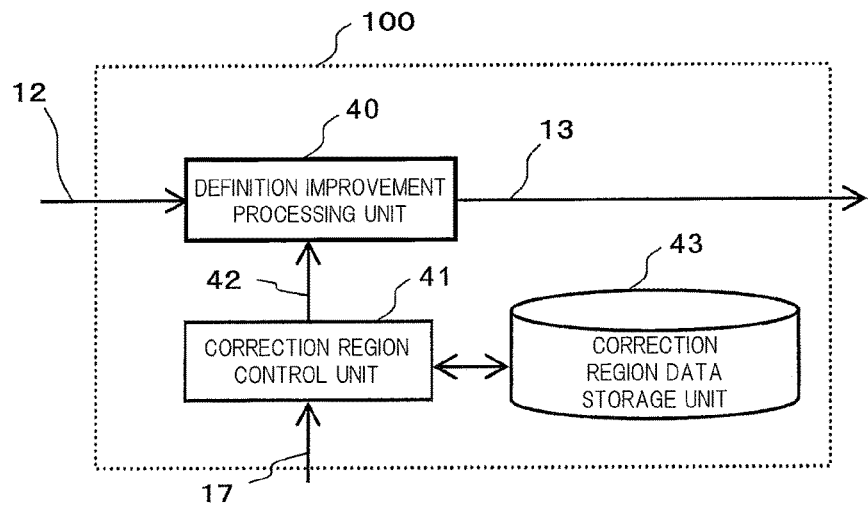
FIG. 2 is a block diagram showing an internal configuration of an image processing unit.
Figure 3:
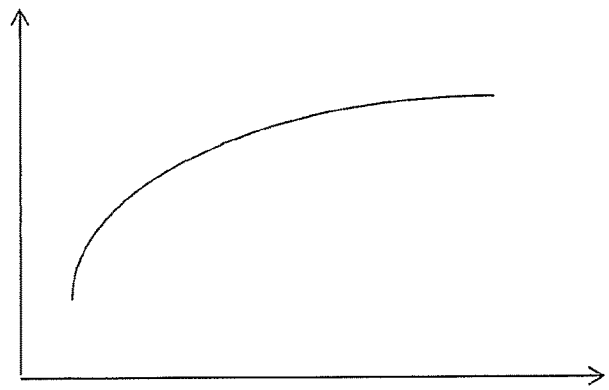
FIG. 3 is diagrams showing correction region decision data examples, in which (a) shows a gradual increase type, (b) shows a linear type, and (c) shows a stepped type.
Figure 3:
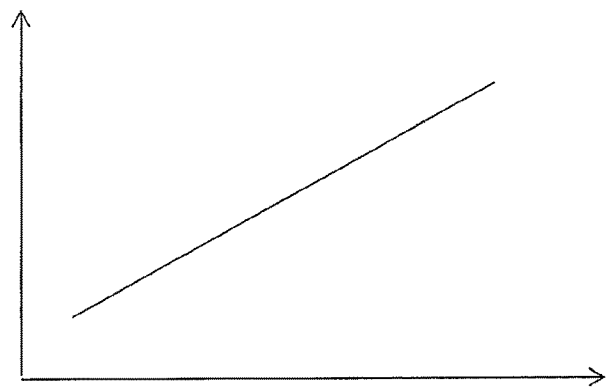
Figure 3:
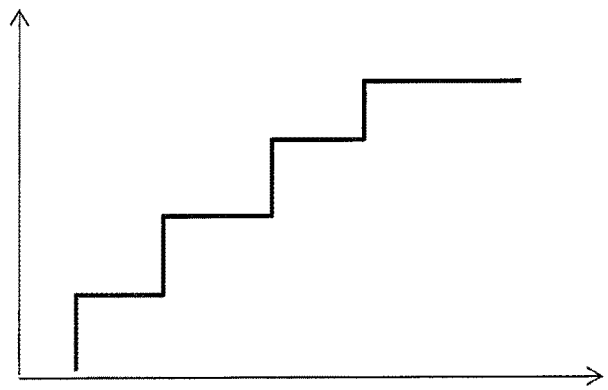

First, a schematic configuration of a video display apparatus according to the first embodiment will be described with reference to FIGS. 1 and 2. FIG. 1 is a block diagram showing the schematic configuration of the video display apparatus according to the first embodiment. FIG. 2 is a block diagram showing an internal configuration of an image processing unit. FIG. 3 is diagrams showing correction region decision data examples, in which (a) shows a gradual increase type, (b) shows a linear type, and (c) shows a stepped type.

A video display apparatus 1 in FIG. 1 is configured to include: an input signal processing unit 11 which receives a video input signal 10 as an input and converts the signal into an internal video signal 12 by using, for example, IP conversion, a scaler, or others; an image processing unit 100 which receives the internal video signal 12 as an input, executes high definition processing according to the present invention, and outputs a corrected video signal 13; a timing control unit 14 which receives the corrected video signal 13 as an input and generates a display control signal 15 from the corrected video signal 13 based on a horizontal/vertical synchronization signal for the display screen (corresponding to a screen 2 in the present embodiment); and an optical device 200 (corresponding to a video display unit) which displays a video. In the present embodiment, the terms "image" and "video" include both a moving image (video) and a still image.

The optical device 200 is configured to include: a light source 203 which emits a light beam for projecting a video onto a screen 20; a panel 202 which receives the display control signal 15 as an input, adjusts a gray level of the light beam from the light source 203 for each pixel, and generates a projection video; a lens 201 for magnifying and projecting the projection video onto the screen.

When the video display apparatus 1 is a direct-view flat-panel display such as a liquid crystal display, plasma display, or an organic EL display, note that the lens 201 of the optical device 200 is not required. A user directly watches the panel 202.

The image processing unit 100 is connected to a viewer detection unit 16 which detects a position of a viewer who watches the video projected on the screen 20 and outputs viewer position information 17. An aspect of the viewer detection unit 16 is not particularly limited to this aspect, and can be achieved by, for example, an existing technique such as distance measurement based on a disparity (parallax) video from a stereo camera or a TOF sensor (distance image sensor).

Further, the image processing unit 100 is also connected to a viewpoint detection unit 18 which detects a viewpoint of the viewer and outputs viewpoint information. The viewpoint detection unit 18 is configured to include: a camera which captures an image of eyeballs of the viewer and generates an eyeball image; and an arithmetic unit which extracts, from the eyeball images, a region where images of the right and left irises and pupils of the viewer's eye are captured and which computes a viewpoint position and a line-of-sight direction. Note that the image processing unit 100 may execute the function of this arithmetic unit. In this case, the viewpoint detection unit 18 outputs the eyeball image as the viewpoint information to the image processing unit 100.

The image processing unit 100 decides at least one of a position and a size of the correction region and the correction characteristics of the image correction processing based on the viewer position information and the viewpoint information, and executes image correction processing for the correction region in accordance with contents of the decision.

As shown in FIG. 2, the image processing unit 100 includes a definition improvement processing unit 40, a correction region control unit 41, and a correction region decision data storage unit 43. The definition improvement processing unit 40 performs high definition processing for a partial region of the image based on the internal video signal 12. Hereinafter, a partial region to be a target of the high definition processing will be referred to as a correction region. The correction region control unit 41 acquires the viewer position information 17 from the viewer detection unit 16, decides a correction region by using this information, and generates a region control signal 42 indicating the coordinates of the correction region and parameters (e.g., a gain, an enhancement intensity, and others) indicating the content of the high definition processing. The correction region decision data storage unit 43 stores correction region decision data to which the correction region control unit 41 refers in deciding the correction region. With reference to FIG. 3, the correction region decision data will be described.

The image correction processing for the above-described correction region 30 is merely an example, and is not limited to this.

In general, it is understood that the central visual field on the screen 20 is narrower as the viewer is closer to the screen and that the central visual field is wider as the viewer is farther away from the screen. Accordingly, in the present embodiment, a parameter "r" is defined as an increasing function with respect to a distance "d". For example, with respect to the distance d, the parameter r may gradually increase as shown in FIG. 3(*a*), linearly increase as shown in FIG. 3(*b*), or increase stepwise as shown in FIG. 3(*c*). The correction region decision data is data indicating the relation between the parameter r defining the size of the correction region and the distance d between the screen and the viewer. In the present embodiment, note that the correction region decision data is shown in a form of a graph. However, the form may be a function or a table, and the data form is not limited.

In the configuration in FIG. 1, when the viewer detection unit 16 detects the position of the viewer with respect to the screen 20 and outputs the viewer position information 17, the image processing unit 100 performs the high definition processing for the internal video signal 12 based on the viewer position information 17. An example of this processing will be described with reference to FIGS. 4 and 5.

Figure 4:
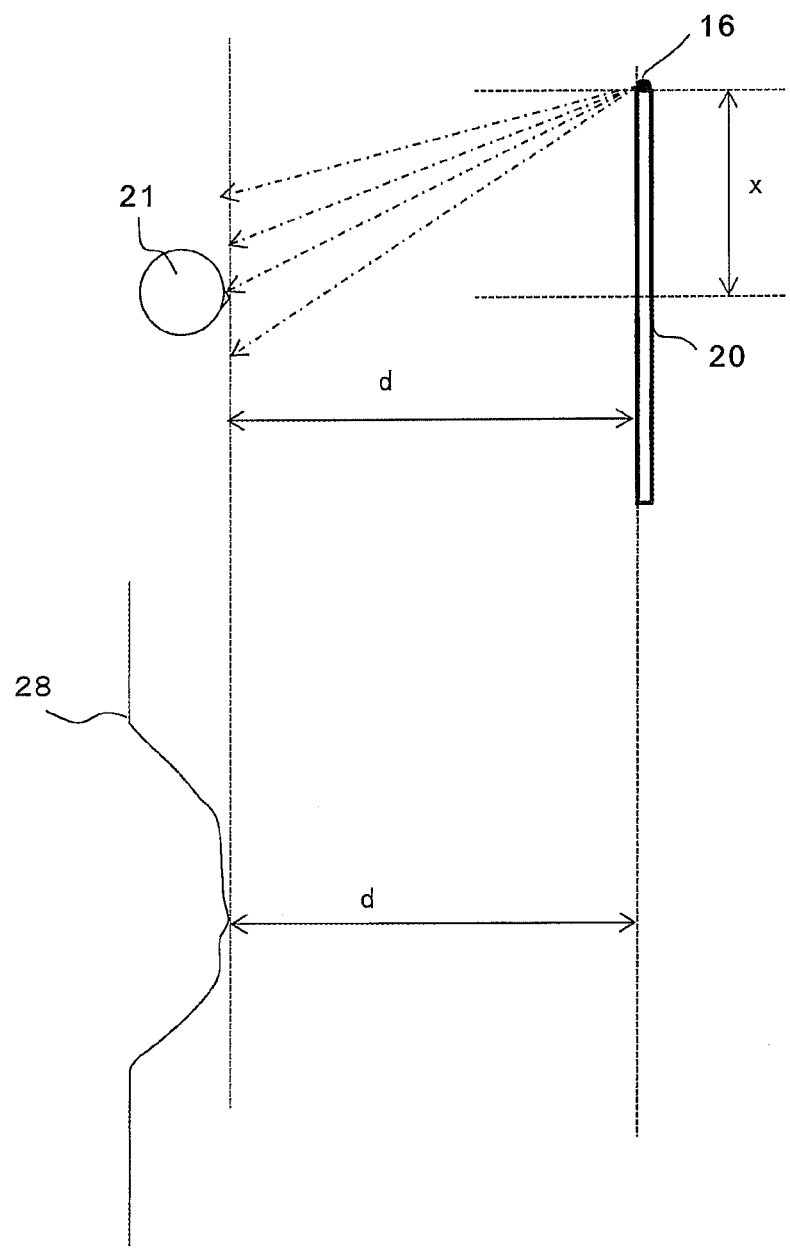
FIG. 4 is a plan view of a screen and a diagram showing the positional relation between the screen and the viewer.

FIG. 4 is a view showing the positional relation between a viewer 21 and a plan view of the screen 20. In FIG. 4, it is assumed that the viewer 21 rightly faces the screen 20 in vicinity of the center of the screen 20 in the X-axis direction. The left end portion of the screen 20 in the X-axis direction (the right-and-left direction when watched from the viewer) has a TOF sensor 16*a* serving as the viewer detection unit 16. The above-described left end portion is a measurement reference point for a distance x along the horizontal direction. Alternatively, each of the right and left end portions of the screen 20 may have a stereo camera. The viewer detection unit 16 formed from the TOF sensor calculates a profile 28 of a detection point based on a reflected wave, and obtains the distance d from each point to the screen 20 through the following equation (1) using a distance "L" to each point of the profile 28 and an irradiation angle "θ" of a laser with respect to the screen 20 at that time.

$$d = L \sin \theta \quad (1)$$

Then, as the distance between the viewer and the screen 20, the viewer detection unit 16 obtains the shortest distance among the distances d obtained for each point, and generates the viewer position information.

Figure 5:
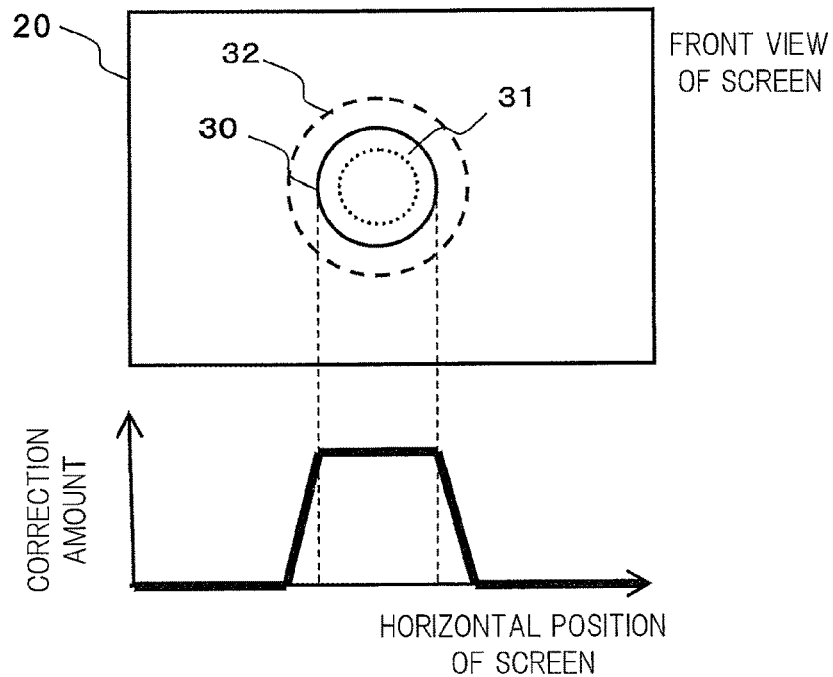
FIG. 5 is a diagram showing examples of a correction region and correction characteristics.

FIG. 5 is a diagram showing examples of the correction region and the correction characteristics. When the screen 20 is separated from the viewer by the distance d, the image processing unit 100 refers to the correction region decision data in FIG. 3, and extracts the parameter r with respect to the distance d. Then, the image processing unit 100 sets the correction region 30, and performs the high definition processing for the inside of the correction region.

The image processing unit 100 performs correction so as to maximize the correction amount inside the correction region 30 and to make the correction amount smaller as a position is farther away from the correction region 30. The reduction amount in FIG. 5 is merely an example. By decrease in a slope of the reduction amount, the image quality difference in vicinity of the boundary of the correction region 30 can be reduced, and therefore, the correction can be visually natural video correction. In contrast to this, by increase in this slop, the image quality difference can be intentionally generated. In this manner, the correction characteristics can be freely selected in accordance with the quality and the content of the display video.

A size of the correction region is changed in accordance with the distance from the viewer 21. If the distance from the viewer 21 is smaller than the distance d, the high definition processing is performed to the inside of the correction region 31 in FIG. 5 which is indicated by the dotted line. If the distance from the viewer 21 is larger than the distance d, the high definition processing is performed to the inside of the correction region 32 indicated by the dotted line. That is, as described above, in the human visual characteristics, the high spatial resolution region in the visual field is limited. Therefore, in accordance with the distance between the screen and the viewer, a definition of the display video in the high spatial resolution region is enhanced, but a definition of the remaining region is not enhanced. By controlling the high definition region as described above, a high-definition and high-visibility video can be displayed with a smaller image processing amount.

Figure 6:
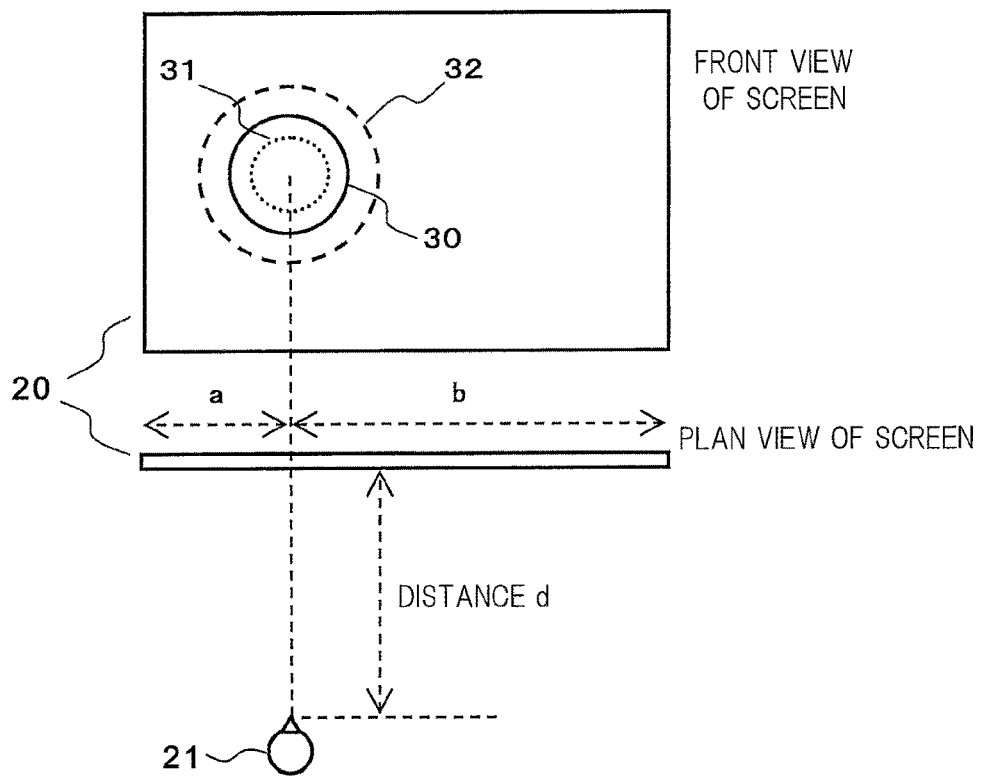
FIG. 6 is a diagram showing examples of positions of the screen and the viewer and a position of the correction region.

Next, with reference to FIG. 6, an example of the display control in accordance with the positions of the screen 20 and the viewer 21 in consideration of the horizontal positional relation of the screen will be described. FIG. 6 is a diagram showing examples of the positions of the screen 20 and the viewer 21 and the position of the correction region.

The viewer detection unit 16 detects the distance d between the screen 20 and the viewer 21 and the position of the viewer with respect to the horizontal position of the screen 20. FIG. 6 exemplifies a case in which the viewer 21 is located at the position at a distance "a" from the left end of the screen and a distance "b" from the right end of the screen. In this case, the definition improvement processing unit 40 of the image processing unit 100 performs the high definition processing for the correction region 30 shown in a front view of the screen 20.

In addition, the size of the correction region 30 is changed in accordance with the distance d from the screen 20 to the viewer 21 as similar to the case described with reference to FIGS. 4 and 5. When the distance from the viewer 21 is smaller than the distance d, the high definition processing is performed for the inside of the correction region 31. When the distance from the viewer 21 is larger than the distance d, the high definition processing is performed for the inside of the correction region 32. By the high definition processing performed at the horizontal position of the screen 20 corresponding to the position of the viewer 21 as described above, the high-definition and high-visibility video display can be achieved with a smaller image processing amount even when the viewer 21 moves.

Figure 7:
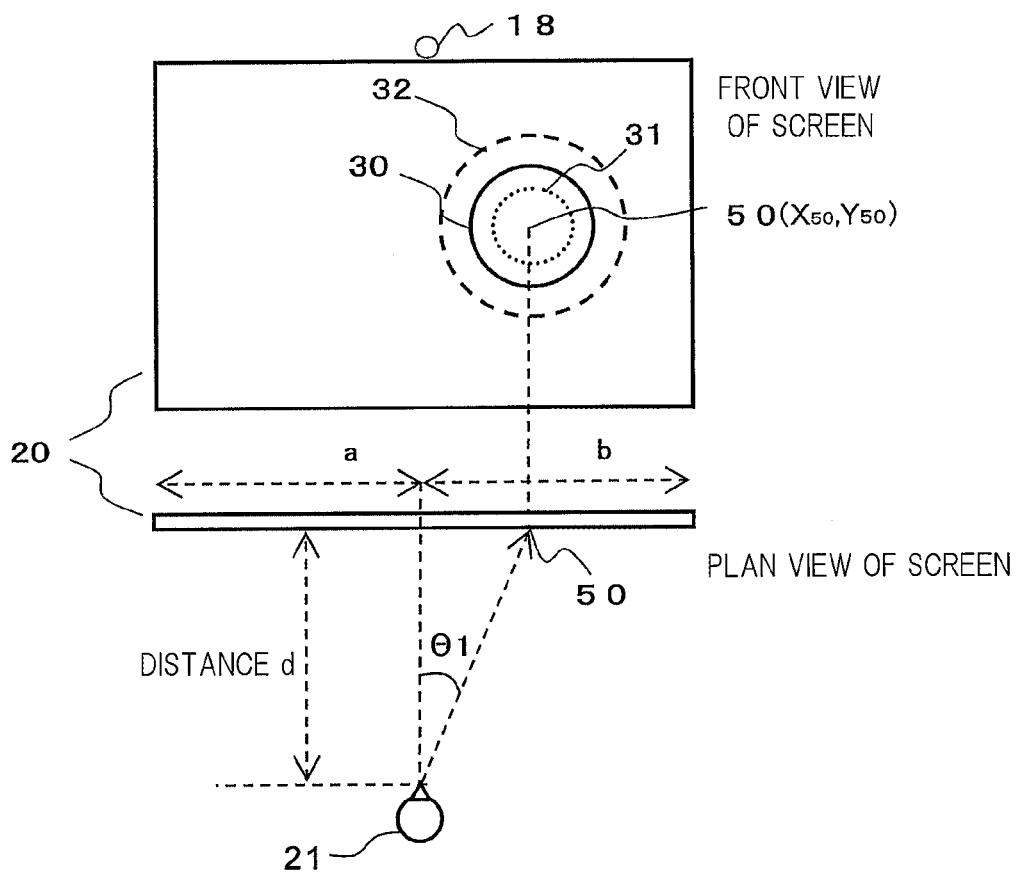
FIG. 7 is diagrams showing a positional relation between a screen 20 and a viewer 21, in which (a) shows an x-coordinate of a reference point (watching point) and (b) shows a y-coordinate of the reference point (watching point)
Figure 7:
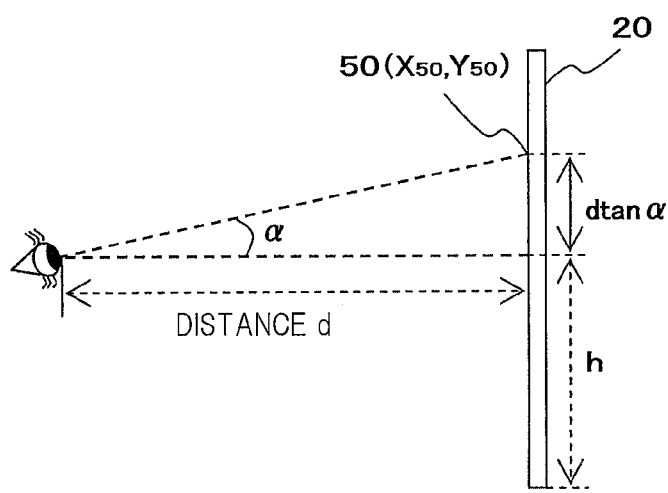

Next, with reference to FIG. 7, an example of display control in consideration of the line-of-sight direction of the viewer 21 in addition to the position of the viewer 21 with respect to the screen 20 will be described. FIG. 7 is a diagram showing the positional relation between the screen 20 and the viewer 21, in which (a) shows the x-coordinate of a reference point (watching point) and (b) shows the y-coordinate of the reference point (watching point). The viewer detection unit 16 detects the distance d between the screen 20 and the viewer 21 and the distance a from the left end portion of the screen along the X-axis direction. In addition, the viewpoint detection unit 18 detects an angle $\theta_1$ of a line of sight of the viewer 21 with respect to the screen.

The correction region control unit 41 can obtain a watching position on the screen 20 based on the distance d and the $\theta_1$ detected as described above. An x-coordinate $x_{50}$ of a reference point 50 in FIG. 7(a) can be obtained by the following equation (2).

$$x_{50}=a+d\tan\theta_1 \quad (2)$$

Similarly, as shown in FIG. 7(b), when the viewer detection unit 16 detects a height "h" from the lower end portion of the screen 20 to the eyes of the viewer 21, and when the viewpoint detection unit 18 detects an elevation angle "α" of the line of sight of the viewer 21, a y-coordinate $y_{50}$ of the reference point 50 is obtained by the following equation (3).

$$y_{50}=h+d\tan\alpha \quad (3)$$

The eye height h may be obtained while the viewer detection unit 16 detects the highest portion (the top of the head) of the viewer, and then, while the correction region control unit 41 refers to the previously-stored anatomical data of the distance from the top of the head to the eyes and subtracts the data from the height of the highest portion. Alternatively, the position information of the eyes detected by the viewpoint detection unit 18 may be used.

The correction region control unit 41 sets the correction regions 30, 31, and 32 centered on the reference point 50 by using a parameter "r" corresponding to the distance d. By the high definition processing performed at the horizontal and vertical positions of the screen 20 which correspond to the position and the line-of-sight direction of the viewer 21 as described above, the high-definition and high-visibility video display can be achieved with a smaller image processing amount even when the line-of-sight direction of the viewer 21 changes. In the above description, note that a correction region is decided in consideration of both the horizontal and vertical positions. However, the correction region may be obtained in consideration of only either one of the horizontal and vertical positions.

Figure 8:
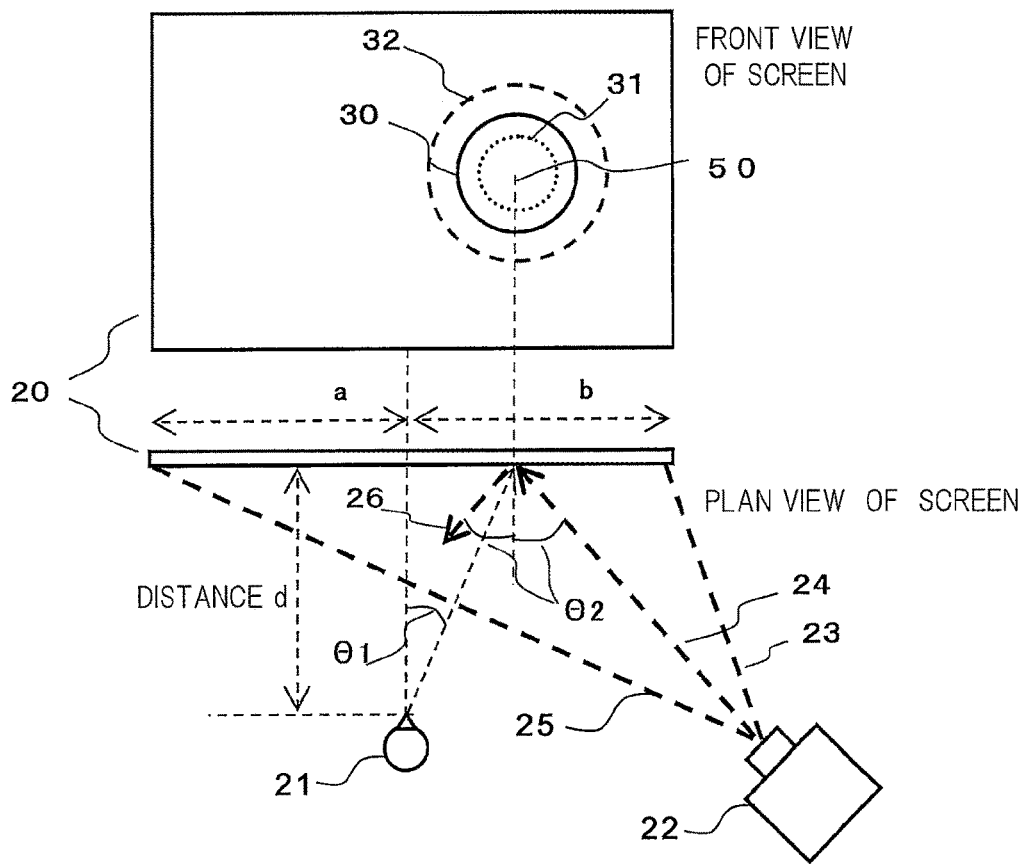
FIG. 8 is a diagram showing an example of display control in consideration of a projection direction from a projector to the screen.
Figure 9:
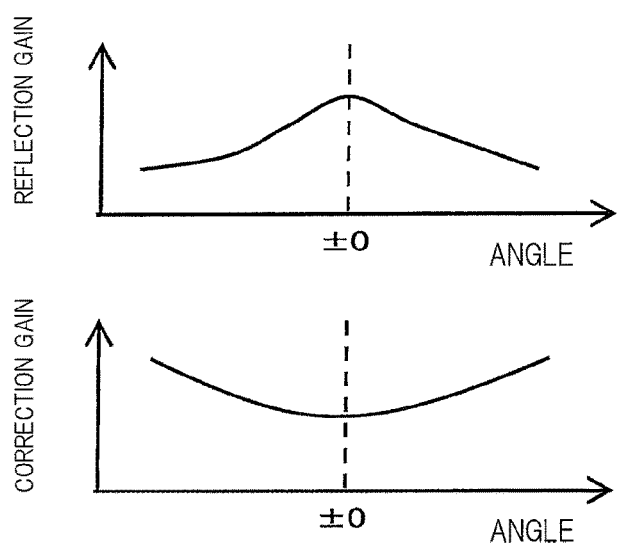
FIG. 9 is a diagram showing examples of a reflection gain and a correction gain in accordance with a projection angle.

Next, with reference to FIGS. 8 and 9, an example of display control in consideration of the projection direction from the projector to the screen in addition to the position of the viewer 21 with respect to the screen 20 and the line-of-sight direction of the viewer 21. FIG. 8 is a diagram showing an example of display control in consideration of the projection direction from the projector to the screen. FIG. 9 is a diagram showing examples of a reflection gain and a correction gain in accordance with a projection angle.

From a projector 22 in FIG. 8, a video is projected in a direction in a range indicated from a dotted line 23 to a dotted line 25, and is displayed on the screen 20. As similar to the example described in FIG. 7, the viewer 21 is located away from the screen 20 by the distance d, and watches in an angular direction $\theta_1$ with respect to the screen 20 as the line-of-sight direction. Therefore, the viewer 21 watches a position having a distance (a+d tan $\theta_1$) from the left end of the screen and at a distance (b−d tan $\theta_1$) from the right end of the screen. A video at this position projected from the projector 22 to the screen 20, i.e., an incident direction of light is indicated by a dotted-line arrow 24, and a direction of reflected light from the screen 20 is indicated by a dotted-line arrow 26. In this example, the video is projected onto the screen 20 at an incident angle $\theta_2$ and is reflected to the opposite side at the same angle. Here, the screen 20 has various light reflection characteristics. In general, as shown in FIG. 9, the screen has characteristics that peak at ±0 degree with respect to the reflection direction. For this reason, the present embodiment controls the correction amount for the video in consideration of an angle made between the line-of-sight direction of the viewer 21 and the projection light from the projector 22 which is reflected by the screen 20.

The correction region control unit 41 sets the correction regions 30, 31, and 32 centered on the reference point 50 by using the parameter r corresponding to the distance d. Here, the video correction amount is changed so as to correct the reflection characteristics in FIG. 9 based on the reflection angle $\theta_2$ from the screen 20 and the line-of-sight direction $\theta_1$ described above. That is, since a value "$\theta_2-\theta_1$" represents the line-of-sight angle with respect to the reflected light, the correction amount for the video is changed based on this angle in accordance with the characteristics shown on the lower part of FIG. 9. By this control, the video display that is easily viewable can be achieved regardless of the position and line-of-sight direction of the viewer 21. In the above description, as the reflection characteristic in FIG. 9, a magnitude of the peak gain and the attenuation amount corresponding to the angle are different depending on the screen, and therefore, the correction amount for the video may be selected in accordance with the characteristics. In addition, in the example of the present embodiment, the achievement of the high definition as the video correction has been described. However, the contrast correction amount may be similarly changed. In this manner, the visibility of the correction region can be improved, not only the definition but also the contrast are increased, so that the more easily viewable video display can be achieved.

Figure 10:
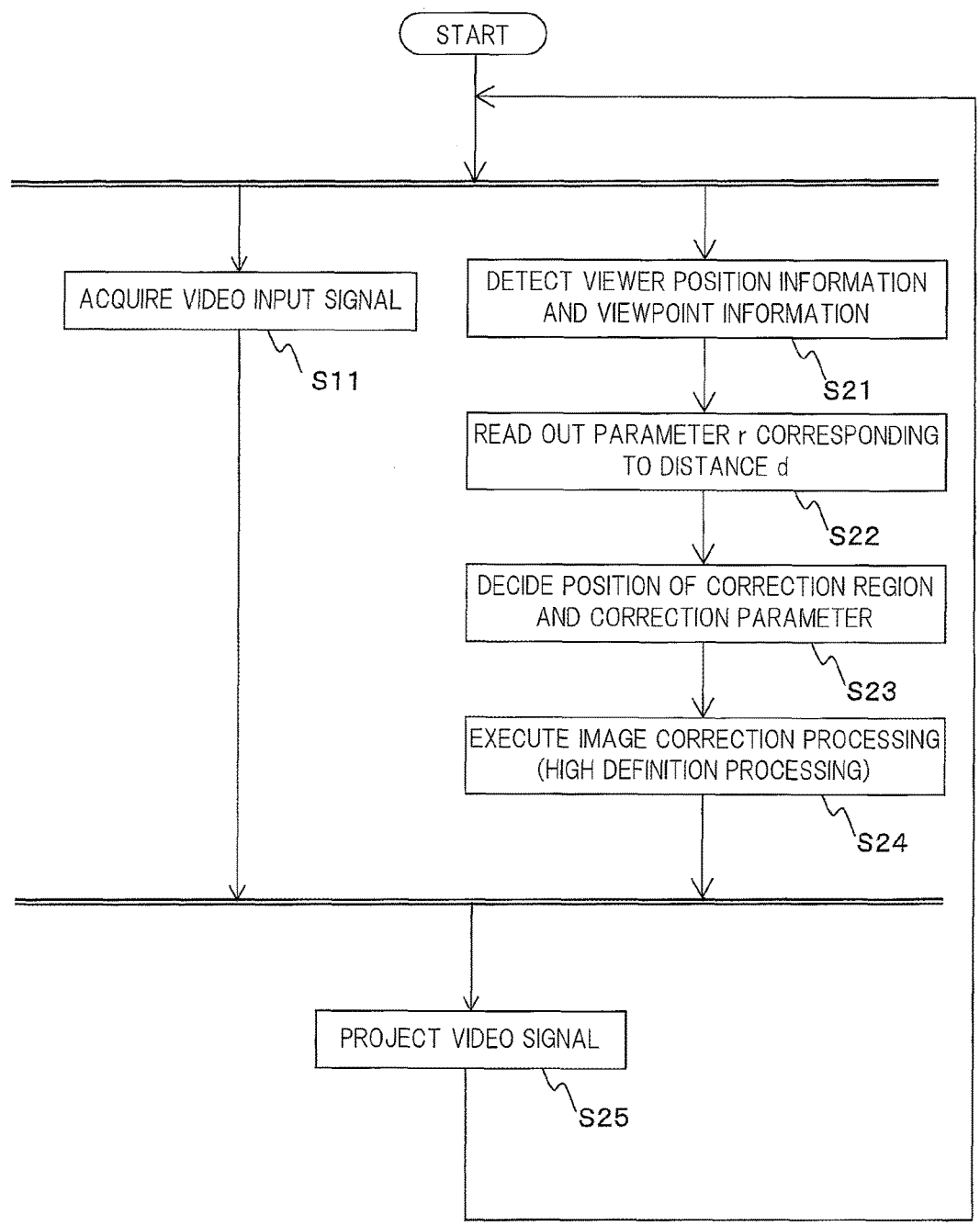
FIG. 10 is a flowchart showing an operation flow of the video display apparatus.
Figure 11:
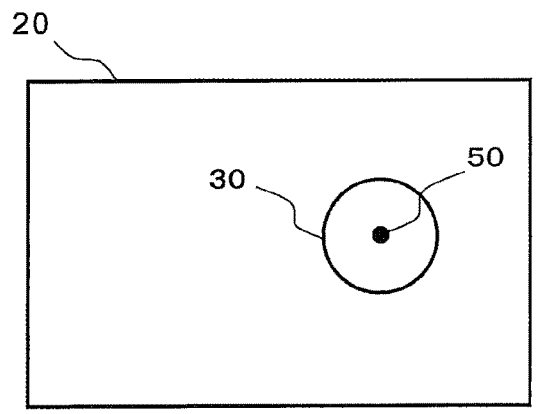
FIG. 11 is a diagram showing an operation example of an image processing unit with reference to a front view of the screen.

With reference to FIGS. 10 and 11, examples of the configuration and the operation of the image processing unit of the video display apparatus according to the present embodiment will be described. FIG. 10 is a flowchart showing an operation flow of the video display apparatus. FIG. 11 is a diagram showing an example the operation of the image processing unit by using a front view of the screen.

The input signal processing unit 11 receives a video input signal from a video signal supply source not shown, and outputs the signal as an internal video signal to the image processing unit 100 (S11). The video supply source outputs image signals, such as a PC, a smartphone, a television set, or a recording/reproducing device.

While an input signal is acquired, the viewer detection unit 16 calculates the position of the viewer (distance d) with respect to the screen 20. In addition, the viewpoint detection unit 18 detects the position of the viewpoint and the line-of-sight direction of the viewer (S21).

The correction region control unit 41 sets, for example, the reference point 50 on the screen 20 as shown in FIG. 7. The correction region control unit 41 may previously set the reference point 50 to the center of the screen 20 in the horizontal and vertical directions, or the user may set the reference point 50 by selecting an optional point. In addition, the correction region control unit 41 may dynamically set the reference point 50 to the viewer position information 17, that is, may set the coordinates in the X- and Y-axis directions every time the viewer position information 17 is updated.

When setting the reference point 50, the correction region control unit 41 refers to the correction region decision data storage unit 43 to read out the parameter r corresponding to the distance d (S22).

As the correction region 30, the correction region control unit 41 sets the region decided based on the reference point 50 using the parameter r (see FIG. 11). The correction region control unit 41 generates the region control signal 42 indicating the position of the correction region 30 (S23). At the same time, the correction region control unit 41 decides a correction parameter such as a correction gain (see FIG. 9) and makes the region control signal 42 contain the contents of the correction parameter as needed. The correction region control unit 41 outputs the region control signal 42 to the definition improvement processing unit 40.

The definition improvement processing unit 40 performs the high definition processing for the internal video signal 12 in accordance with the region control signal 42, and outputs the resultant signal as the corrected video signal 13 to the timing control unit 14 (S24). The specific processing of the definition improvement processing unit 40 is not particularly limited as long as the definition of the video can be improved, such a processing as a general high-frequency enhancer for video signals or super-resolution processing for resolution restoration.

The timing control unit 14 generates the display control signal 15 based on the input corrected video signal 13, and outputs the display control signal 15 to the panel 202, so that the video signal is projected through the lens 201 (S25). Then, the process returns to step S11 and step S21 to receive the next video signal and repeat the processing of detecting the position and the line-of-sight direction of the viewer. FIG. 10 shows the processing flow in a form of a loop. If no video signal is input, the process stands by in S11, and the main power supply of the video display apparatus 1 is turned off, and then, a termination sequence (not shown) is executed to also terminate the processing in FIG. 10.

According to the present embodiment, a correction region is set in accordance with the distance from the screen 20 to the viewer 21, and the high definition processing is performed for the set region. Therefore, the present embodiment can have the smaller load associated with the image processing than that in the case of the high definition processing for the entire video while increasing the spatial resolution of a region in vicinity of the central visual field of the viewer 21.

In addition, according to the embodiment described above, by the decision of the position of the correction region in consideration of the line-of-sight direction, the correction region can follow the movement of the viewpoint of the viewer 21.

In addition, by the consideration of the projection direction and the line-of-sight direction with respect to the projector, the image unsharpness caused by the difference in the angle with respect to the screen can be corrected.

In the above description, the shape of the correction region is described as a circular shape. However, the shape is not limited to this, and the effects of the present invention can be similarly obtained even in an elliptic or a rectangular shape. The achievement of the high definition of the inside of the set correction region has been described so far. However, the correction may be performed so as to reduce the definition of outside of the correction region without the high definition of the inside of the correction region. In this manner, the definition of the inside of the correction region is higher than the definition of the outside of the correction region, and therefore, the effects of the present invention can be obtained.

Second Embodiment

Figure 12:
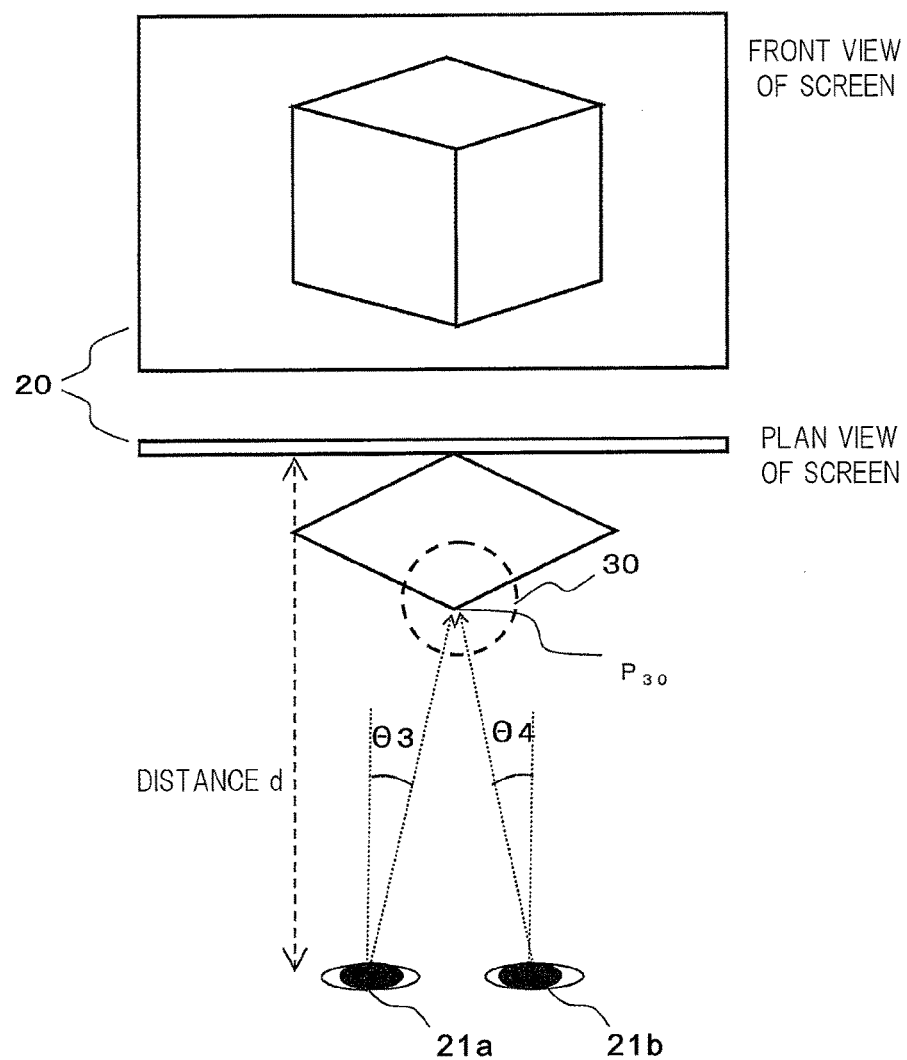
FIG. 12 is a diagram showing an example of displaying a stereoscopic video on the screen with reference to a front view and a plan view.
Figure 13:
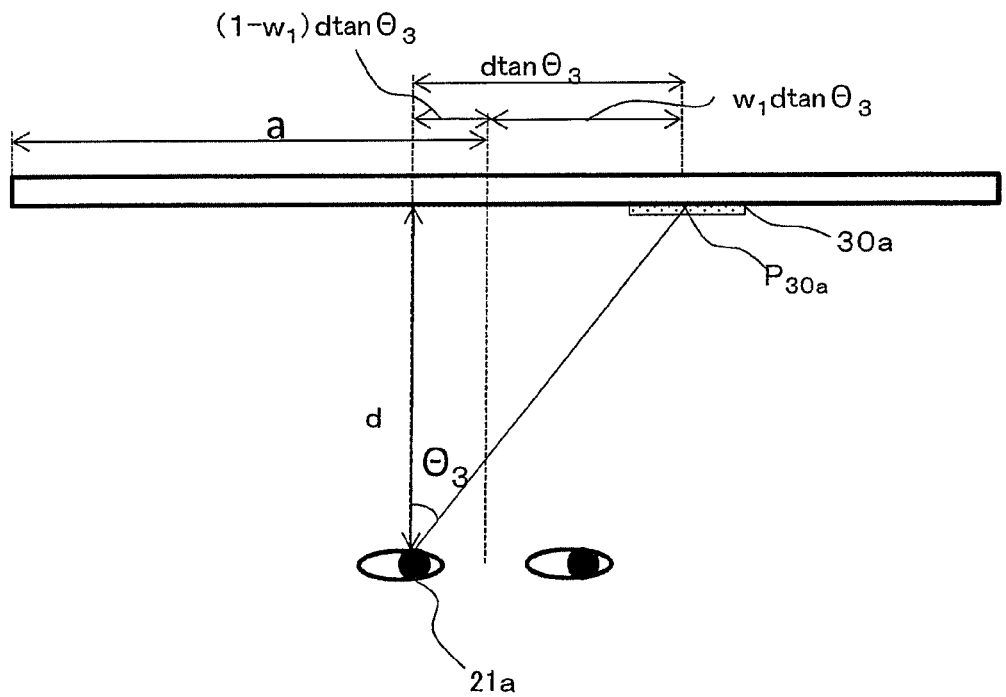
FIG. 13 is diagrams showing an example of calculating a correction region according to the second embodiment, in which (a) shows a case of a left eye and (b) shows a case of a right eye.
Figure 13:
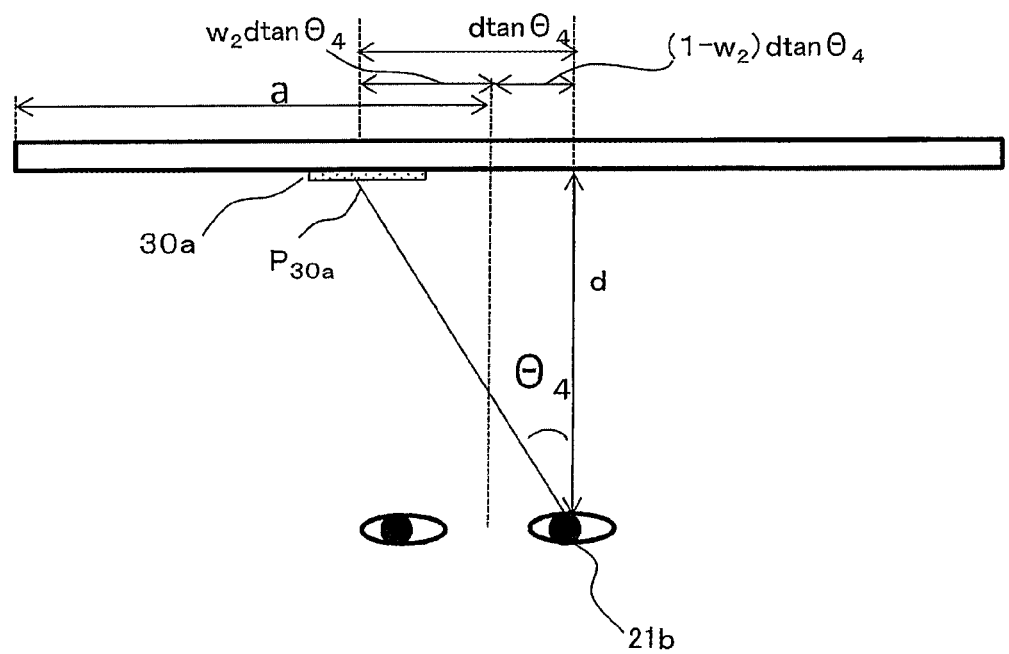

The second embodiment is an embodiment in which the present invention is applied to a stereoscopic video. The second embodiment will be described below with reference to FIGS. 12 and 13. FIG. 12 is diagrams for an example of displaying the stereoscopic video on the screen 20 as shown by a front view and a plan view. FIG. 13 is diagrams showing an example of calculating a correction region according to the second embodiment, in which (a) shows a case of the left eye and (b) shows a case of the right eye.

In FIG. 12, the positions of the right and left eyes of the viewer are denoted by reference characters 21a and 21b. It is said that, when the human eyes watch one point, the human virtually recognizes a perspective (distance) by the right and left eye's watching in different directions from each other. An angle made by the right and left eye's watching is called a convergence angle. For this reason, in an example of the present embodiment, the high definition position in the perspective direction is additionally controlled by using the right and left eye's line-of-sight directions.

In FIG. 12, when it is assumed that the watching direction of the left eye 21a is defined as $\theta_3$ and that the watching direction of the right eye 21b is defined as $\theta_4$, a watching position including a distance d to the watching position can be obtained from a distance between the right and left eyes and from the respective watching angles. The control is made so that the high definition processing is performed for a range indicated by a correction region 30 with respect to the watching point $P_{30}$. In general stereoscopic display, the watching position by the eyes is on the screen. By the high visibility of the practical video at the watching position as described in the present embodiment, the viewer can watch the position of the displayed video, so that a video having a reality closer to a reality in watching of a real object can be reproduced. Note that the range of the correction region 30 is controlled by using the distance d from the viewer as similar to the above-described embodiment.

FIG. 13 shows an example of arithmetic processing for the correction region 30 in the positional relation shown in FIG. 12. Practically, the correction region 30 including the watching point $P_{30}$ on the stereoscopic image is a point formed by virtual images of a left-eye image visually recognized by the left eye 21a and a right-eye image visually recognized by the right eye 21b, which are projected onto the screen 20. For this reason, as shown in FIG. 13(a), a correction region control unit 41 obtains an x-coordinate $x_{30a}$ of a reference point 50 in a region 30a in the left-eye image, on which the correction region 30 is practically projected, from the following equation (4) using a distance "d" from a screen 20 to a viewer 21 (which is a detection value obtained by a viewer detection unit 16), a distance "a" from the left end portion of the screen to the viewer 21 (which is regarded as a distance to a midpoint between the right and left eyes), and a convergence angle "$\theta_3$".

$$x_{30a} = a + w_1 \times d \tan \theta_3 \qquad (4)$$

Note that "$w_1$" is a weighting coefficient which becomes larger as the d becomes larger.

Similarly, as shown in FIG. 13(b), the correction region control unit 41 obtains an x-coordinate $x_{30b}$ of a reference point 50 in a region 30b in the right-eye image, on which the correction region 30 is practically projected, from the following equation (5) using the distance "d" from the screen 20 to the viewer 21, the distance "a" from the left end portion of the screen to the viewer 21, and a convergence angle "$\theta_4$".

$$x_{30b} = a - w_2 d \tan \theta_4 \qquad (5)$$

Note that "$w_2$" is a weighting coefficient which becomes larger as the d becomes larger.

In addition, when it is assumed that an elevation angle is defined as "$\alpha$", the right and left eyes generally form the same elevation angle $\alpha$. For this reason, from the above-described equation (3), the y-coordinates of the reference points in the left- and right-eye images for forming the correction region 30 with respect to the watching point $P_{30}$ can be obtained.

According to the present embodiment, even when the watching point is located on the stereoscopic video, the high definition processing is performed for a partial region including the watching point, so that the reduction in the data amount and the load associated with the image processing can be achieved while improving the spatial resolution.

Third Embodiment

Figure 14:
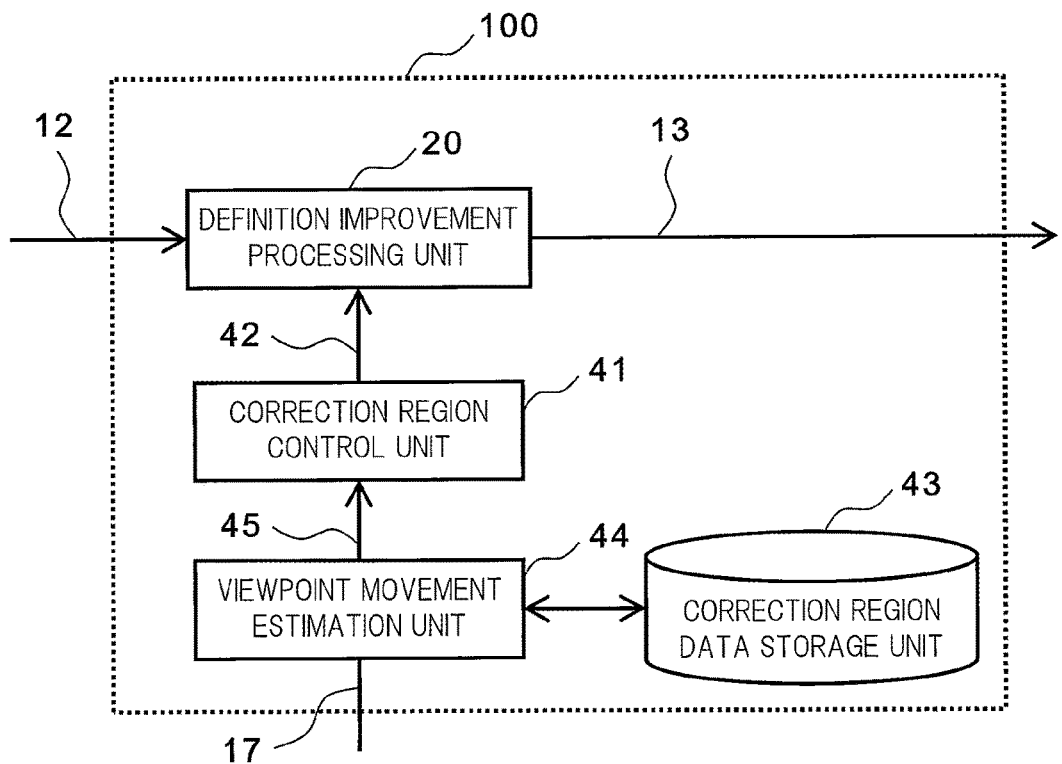
FIG. 14 is a block diagram showing a configuration example of an image processing unit according to the third embodiment.
Figure 15:
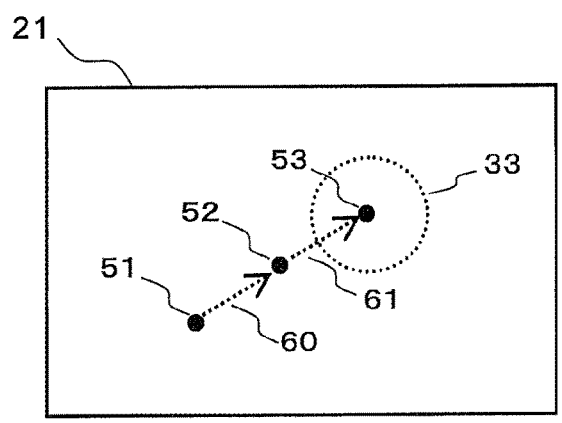
FIG. 15 is a diagram showing estimation processing of the watching point.

In the third embodiment, when the high definition processing according to the present invention is controlled based on movement of the viewer or change in the viewpoint of the same, the control is made while predicting the change. In general video processing, time delay occurs in a processing flow. By previously performing the image processing while estimating the delay, and then, estimating the movement location, more realistic display can be achieved. With reference to FIGS. 14 and 15, the third embodiment will be described below. FIG. 14 is a block diagram showing an example of a configuration of an image processing unit 100 according to the third embodiment. FIG. 15 is a diagram showing the processing for estimating the watching point.

As shown in FIG. 14, an image processing unit 100a further includes a viewpoint movement estimation unit 44. The viewer position information detected by a viewer detection unit 16 and the viewpoint information detected by a viewpoint detection unit 18 are input to the viewpoint movement estimation unit 44. The viewpoint movement estimation unit 44 estimates the movement destination of the viewpoint based on the viewer position information and the viewpoint information. This estimation method will be described based on FIG. 15.

When a watching point 51 and a watching point 52 in FIG. 15 are input to the viewpoint movement estimation unit 44 in a time series, the viewpoint movement estimation unit 44 obtains a movement vector 60 between the watching points 51 and 52, and obtains a watching point 53 by adding movement with a movement vector 61 having the same amount as that of the movement vector 60 to the watching point 52. Then, the viewpoint movement estimation unit 44 outputs the coordinates of the watching point 53 as the estimated position information 45.

A correction region control unit 41 outputs a region control signal 42 based on the estimated position information 45. The definition improvement processing unit 40 performs the high definition processing for an internal video signal 12 based on the region control signal 42, and outputs a corrected video signal 13. The subsequent operations are the same as those in the example of the embodiments described above.

According to the present embodiment, a video at the next viewpoint position can be previously corrected, and therefore, more natural video display can be achieved without the delay. Note that the above description has explained the example in which the movement vector is obtained by using only the two-point information of the two watching points 51 and 52 obtained in the time series. However, it is not required to use only two points as the information, and the vector may be predicted based on the information having two or more points.

Fourth Embodiment

Figure 16:
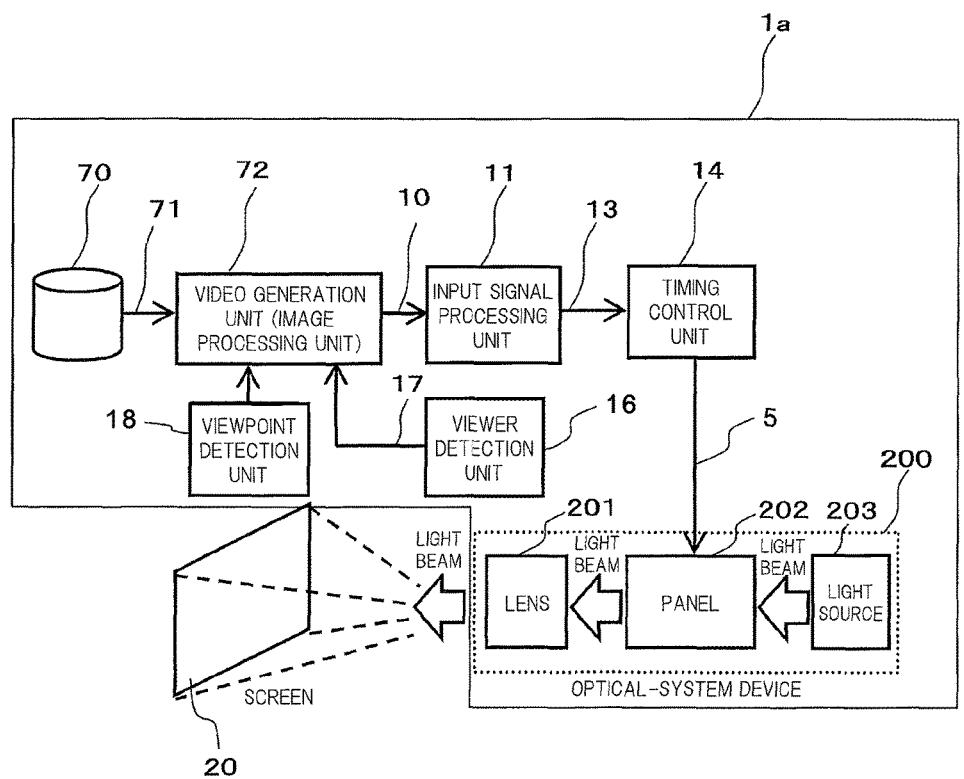
FIG. 16 is a block diagram showing a configuration of a video display apparatus according to the fourth embodiment.

The fourth embodiment is an embodiment in which a video to be displayed is also generated by a video display apparatus according to the present invention. With reference to FIG. 16, the fourth embodiment will be described below. FIG. 16 is a block diagram showing a configuration of a video display apparatus according to the fourth embodiment.

A configuration of a video display apparatus 1a shown in FIG. 16 is different from that of the video display apparatus 1 according to the first embodiment in that it further includes a video accumulation unit 70 and a video generation unit 72, and that a viewer detection unit 16 inputs viewer position information to the video generation unit 72.

The video accumulation unit 70 accumulates stereoscopic video model data 71, and outputs the stereoscopic video model data 71 to the video generation unit 72 as needed. The video generation unit 72 performs viewpoint conversion processing for the stereoscopic video model data 71, and outputs the result as a video input signal 10 to an image processing unit 100 via an input signal processing unit 11. At this time, the viewpoint conversion processing of the video generation unit 72 is performed based on the viewer position information and the line-of-sight information detected by the viewer detection unit 16 and a viewpoint detection unit 18. To the stereoscopic video model data 71, the video generation unit 72 performs a processing for converting a size, an angle, or others of an object in a video to be displayed based on the viewer position information and the line-of-sight information, so that a video corresponding to the watching direction of the viewer is generated.

For the stereoscopic video model data 71 that has been subjected to the processing for converting the size or the angle, the video generation unit 72 sets a correction region by using the viewer position information and the line-of-sight information, and performs the high definition processing. Therefore, the video generation unit 72 corresponds to the image processing unit 100.

According to the present embodiment, the viewpoint conversion processing for the stereoscopic video model data 71 and the high definition processing for the position watched by the viewer can be performed by using the information detected by the viewer detection unit 16, so that the stereoscopic video display that is easily viewed can be achieved.

Fifth Embodiment

Figure 17:
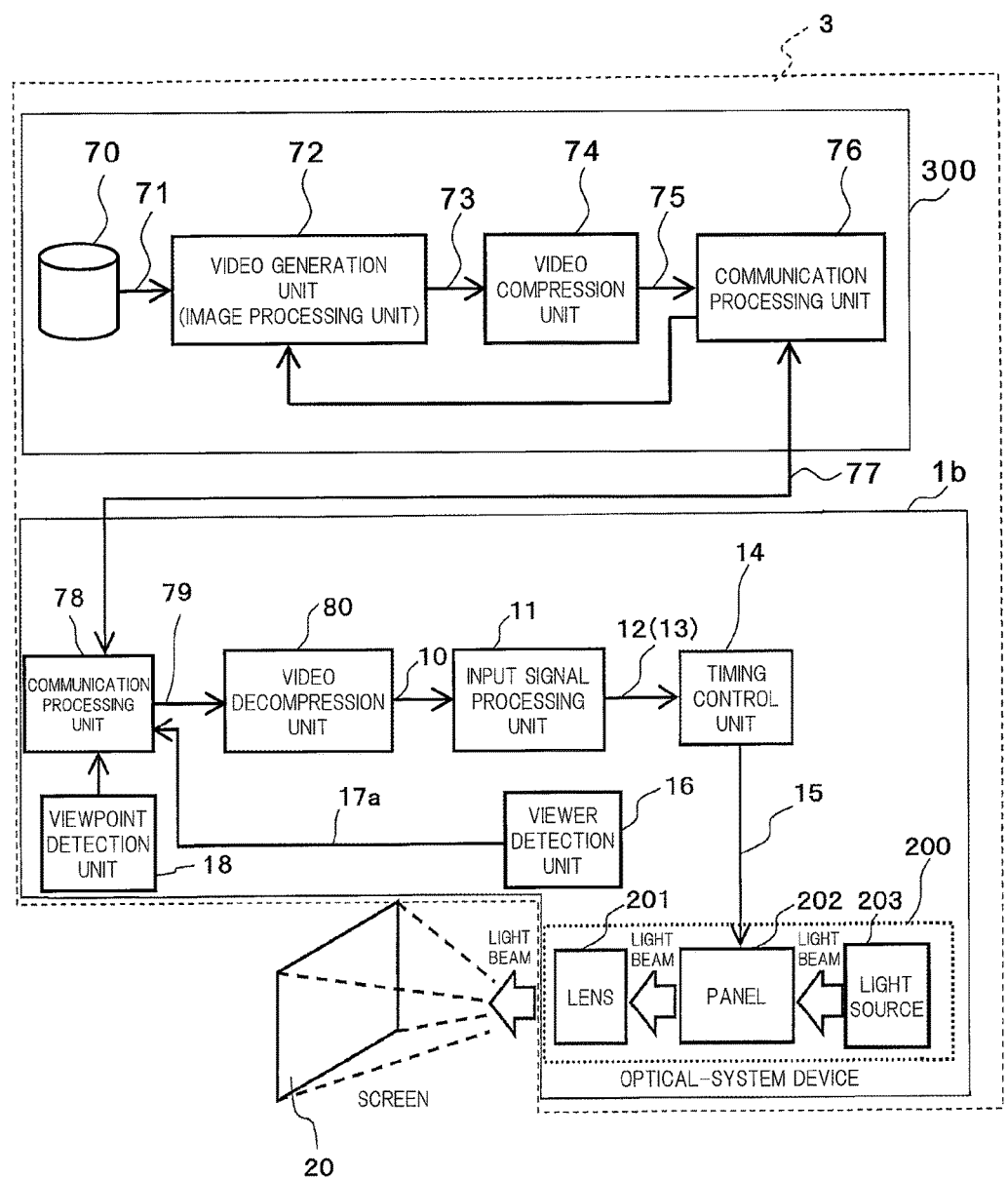
FIG. 17 is a diagram showing a schematic configuration of a video display system according to the fifth embodiment.

The fifth embodiment is an embodiment in which a compression ratio of a correction region to be subjected to the high definition processing is different from a compression ratio of a region different from the correction region. With reference to FIG. 17, the fifth embodiment will be described below. FIG. 17 is a diagram showing a schematic configuration of a video display system according to the fifth embodiment.

A video display system 3 in FIG. 17 is formed by communication connection between a server 300 and a video display apparatus 1b.

The server 300 includes a video accumulation unit 70, a video generation unit 72, a video compression unit 74, and a communication processing unit 76. The server 300 is, for example, a server personal computer on a cloud computing system.

Meanwhile, the video display apparatus 1b includes a communication processing unit 78 and a video decompression unit 80 in addition to the video display apparatus 1 according to the first embodiment. A viewer detection unit 16 and a viewpoint detection unit 18 output viewer position information 17a and viewpoint information to the communication processing unit 78. In the video display system 3, the high definition processing is executed by the server 300, and therefore, the server 300 has a function corresponding to the image processing unit 100 in place of the video display apparatus 1b.

The communication processing unit 76 of the above-described server 300 is connected to the communication processing unit 78 of the video display apparatus 1b via a network 77, e.g., a public line such as the Internet or a dedicated line.

Next, the operation of the video display apparatus 1b will be described. The communication processing unit 78 of the video display apparatus 1b transmits the viewer position information and the viewpoint information to the server 300. The communication processing unit 76 of the server 300 outputs the received viewer position information and viewpoint information to the video generation unit 72. For the stereoscopic video model data 71 acquired from the video accumulation unit 70, the video generation unit 72 performs the viewpoint conversion processing and the high definition processing by using the viewer position information and the viewpoint information to generate a video signal 73. Therefore, the video generation unit 72 corresponds to the image processing unit 100.

To the video compression unit 74, the video generation unit 72 outputs the correction region information indicating the position of the correction region that has been subjected to the high definition processing, together with the video signal 73. The video compression unit 74 executes compression processing while changing the compression characteristics of the correction region of the video signal 73 and a region other than the correction region (to be referred to as an "out-of-correction region" below) based on the correction region information. More specifically, the video compression unit 74 performs the compression processing while relatively decreasing the compression ratio of the video in the correction region and relatively increasing the compression ratio in the out-of-correction region based on the correction region information. A video signal 75 which has been compressed (to be referred to as a "compressed video signal" below) and the correction region information are transmitted to the video display apparatus 1b.

The transmitted compressed video signal 75 and correction region information are received by the communication processing unit 78, and are output to the video decompression unit 80.

The video decompression unit 80 refers to the position and the compression ratio of the correction region and the position and the compression ratio of the out-of-correction region, which are indicated by the correction region information, performs the decompression processing for the compressed video signal, and outputs a video input signal 10. The subsequent processing flow is the same as that of the operation example described above. Note that the image processing unit 100 does not perform the high definition processing. However, the image processing unit 100 may perform other types of image processing such as noise reduction, contour enhancement processing, and bit rate conversion processing. Alternatively, when the image processing unit 100 does not execute the other types of the image processing except for the high definition processing, the image processing unit 100 may be not provided.

According to the present embodiment, the high definition processing is executed by the information processing apparatus (server 300) formed separately from the video display apparatus 1b, so that the image processing load associated with the video display apparatus 1b can be reduced.

In addition, the compression ratio of the out-of-correction region is increased while keeping the video quality by decreasing the compression ratio of the correction region that has been subjected to the high definition processing, so that the amount of data to be transmitted can be reduced. Also in the present embodiment, more natural video display with less delay can be achieved as similar to the above-described embodiments by the prediction for the viewpoint movement and each video processing based on the predicted position information.

Sixth Embodiment

The sixth embodiment is an embodiment using a plurality of video display apparatuses according to the present invention. In the following example, two projectors will be described. However, the number of projectors is not limited to two. With reference to FIGS. 18 and 19, the sixth embodiment will be described below. FIG. 18 shows an example of a configuration in which two video display apparatuses superimpose and project the videos onto the same screen. FIG. 19 shows an example of a configuration in which two video display apparatuses project videos side by side on the same screen.

In a video display system 4 shown in FIG. 18, a first video display apparatus 1c and a second video display apparatus 1d superimpose and project videos on the same screen.

The first video display apparatus 1c includes: an input signal processing unit 11a which receives a video input signal 10a as an input and which converts the signal into an internal video signal 12a by, for example, IP conversion or a scaler; an image processing unit 100a which receives the internal video signal 12a as an input; a timing control unit 14a which receives a corrected video signal 13a as an input and which generates a display control signal 15a from the corrected video signal based on horizontal and vertical synchronization signals for the display screen; and an optical system device 200a which displays a video. The image processing unit 100a is connected to a viewer detection unit 16 which detects the position of the viewer who watches the video projected onto the screen and outputs viewer position information 17.

The optical system device 200a is configured of a light source 203a which emits a light beam for projecting a video onto a screen, a panel 202a which receives the display control signal 15a as an input and which adjusts a gray level of the light beam from the light source 203a for each pixel to generate a projection video, and a lens 201a for magnifying and projecting the projection video onto the screen.

Next, the second video display apparatus 1d has the same configuration as that of the first video display apparatus 1c. The viewer detection unit 16 connected to the image processing unit 100a of the first video display apparatus 1c is also connected to the image processing unit 100b of the second video display apparatus 1d. In this configuration, first, when the video input signal 10a and the video input signal 10b are formed into the same video signal, the same video processing is performed in the first video display apparatus 1c and the second video display apparatus 1d, so that a video having a luminance as much as twice the original can be displayed on the screen.

Next, an example of displaying the stereoscopic video will be described. First of all, the right-eye video of the stereoscopic video is input as the video input signal 10a, and the left-eye video of the stereoscopic video is input as the video input signal 10b. The first and second video display apparatuses 1c and 1d respectively perform the right-eye video processing and the left-eye video processing based on the viewer position information 17, and project the resultant videos onto the screen. The viewer watches the videos while inserting polarizing plates with different polarizing directions between the lenses and the screen in the projection of the videos, and at the same time, wearing polarizing eyeglasses corresponding to the resultant polarized light. In such a manner, the viewer can watch the stereoscopic video. As the polarization system at this time, linear polarization, circular polarization, and others are cited, and the polarization system is not particularly limited.

Even for the stereoscopic video displayed as described above, more natural high-visibility display can be achieved by the high definition processing in accordance with the position of the viewer.

In a video display system 4a shown in FIG. 19, the first video display apparatus 1c and the second video display apparatus 1d project videos side by side on the same screen. This system is different from the video display system. 4 in FIG. 17 in that an internal video signal 12b of the second video display apparatus 1d is obtained from an input signal processing unit 11a of the first video display apparatus 1c. That is, the input signal processing unit 11a outputs the videos, which are separated from each other in accordance with their display positions when being displayed side by side on the right and left sides, as the internal video signal 12a and the internal video signal 12b to an image processing unit 100a of the first video display apparatus 1c and an image processing unit 100b of the second video display apparatus 1d, respectively. In this manner, even when the videos are displayed side by side on the right and left sides, more natural high-visibility display can be achieved by the high definition processing in accordance with the position of the viewer.

In addition, the image processing unit 100a is connected to the image processing unit 100b. The information indicating the line-of-sight position detected/estimated by each one of the image processing units 100a and 100b is output to the other one of the image processing units 100b and 100a, and each one of the image processing units 100a and 100b decides the correction region by using the line-of-sight position information acquired from the other one of the image processing units 100b and 100a. In this manner, when the correction region 30 of the first video display apparatus 1c gradually approaches the boundary line between the screens 1 and 2, the second video display apparatus 1d can detect that the correction region 30 is approaching the projection range of itself. In this manner, even when a reference point is located in the first video display apparatus 1c and when only a part of the correction region 30 is included in the screen 2, the second video display apparatus 1d can perform the high definition processing for the partial region.

In this manner, even when the viewpoint of the viewer moves across the boundary line between the screens 1 and 2, the viewer can watch a smoother high-definition video.

Each embodiment described above does not limit the present invention, and has various alterations within the scope of the present invention. These various alterations also belong to the technical range of the present invention. Also, an optional combination among the above-described first to sixth embodiments is applicable.

In the above description, the example in which the correction region is obtained by using both the viewer position information and the viewpoint information has been described. However, the correction region may be obtained by using only the viewer position information or the viewpoint information.

Further, in each embodiment described above, one correction region is shown and explained for one image (may be referred to as one frame instead in the case of the video signal). However, when there are a plurality of viewers, a correction region may be set with reference to the watching point by each of the viewers. That is, a plurality of correction regions may be set for one image.

EXPLANATION OF REFERENCE CHARACTERS

1: video display apparatus, 20: screen, 21: viewer, 22: projector, 30, 31, and 32: correction region

The invention claimed is:
1. A video display apparatus that receives an input of a video input signal and that displays a video based on the video input signal, comprising:
   a viewer detector that detects a positional relation between a display screen on which the video is displayed and a viewer who watches the video, and that generates viewer position information including a result of the detection;
   an apparatus-side communication processor that transmits the viewer position information to a server;
   a video decompression processor communicatively coupled with the apparatus-side communication processor, that decompresses a compressed image;
   a video display that displays the video on the display screen; and
   an image processor communicatively coupled with the viewer detector, that sets, based on the viewer position information, a correction region for an image based on the video input signal, and that executes the image correction processing for the correction region, and
   wherein the video decompression processor performs decompression processing for the compressed image that has been subjected to compression processing for the image having been subjected to the image correction processing while relatively decreasing a compression ratio of the correction region and relatively increasing a compression ratio of an out-of-correction region of the image, which is a region different from the correction region.
2. The video display apparatus according to claim 1,
   wherein the viewer detector detects a distance from the display screen to the viewer, and
   the image processor relatively decreases a size of the correction region when the distance from the display screen to the viewer is relatively short, and relatively increases the size of the correction region when the distance is relatively long.

3. The video display apparatus according to claim 1,
wherein the image processor decides at least one of a position of the correction region, a size of the correction region, and correction characteristics of the image correction processing based on the viewer position information, and executes the image correction processing in accordance with a content of the decision.

4. The video display apparatus according to claim 1,
wherein the viewer detector detects, as the positional relation, at least one of a distance from the display screen to the viewer, a distance from a measurement reference point on the display screen to the viewer along a horizontal direction, and a height from the measurement reference point on the display screen to an eye of the viewer.

5. The video display apparatus according to claim 1, further comprising
a viewpoint detector communicatively couple with the image processor that detects at least one of a viewpoint position and a line-of-sight direction of the viewer and that outputs viewpoint information,
wherein the image processor decides a position of the correction region by further using the viewpoint information.

6. The video display apparatus according to claim 5,
wherein the video display is a video projector that projects the video onto the display screen, and
the image processor decides a size of the correction region and at least one of correction characteristics by further using an angle with respect to the display screen in projection by the video projector and reflection characteristics of the display screen.

7. The video display apparatus according to claim 5,
wherein the video display is a video projector that projects the video onto the display screen,
the viewpoint detector detects a convergence angle made by right and left eyes of the viewer who watches the video displayed by the video projector, and
the image processor performs the image correction processing for the correction region which corresponds to a watching point on a space obtained by the convergence angle and which is included in the video on the display screen.

8. The video display apparatus according to claim 5,
wherein the image processor estimates a viewpoint direction of the viewer based on a past history of the viewpoint information, and sets the correction region based on an estimated position of viewpoint movement.

9. The video display apparatus according to claim 8,
wherein, from another video display apparatus different from the video display apparatus, the image processor obtains information indicating the estimated position of the viewpoint movement estimated by the another video display apparatus, and the image processor uses the obtained information and executes the image correction processing for the video input signal that has been input to the video display apparatus.

10. The video display apparatus according to claim 1,
wherein the image processor performs at least one of definition correction and contrast correction for the correction region.

11. A video display system comprising a server that performs image correction processing for a video input signal and a video display apparatus that receives a video signal, having been subjected to the image correction processing, from the server and that displays a video based on the video signal,
wherein the video display apparatus includes:
a viewer detector that detects a positional relation between a display screen on which the video is displayed and a viewer who watches the video, and that generates viewer position information including a result of the detection;
an apparatus-side communication processor that transmits the viewer position information to the server;
a video decompression processor communicatively coupled with the apparatus-side communication processor, that decompresses a compressed image; and
a video display that displays the video on the display screen,
the server includes:
a server-side communication processor that receives the viewer position information;
an image processor that sets, based on the viewer position information, a correction region for an image based on the video input signal, and that executes the image correction processing for the correction region; and
a compression processor communicatively coupled with the image processor of the server, that performs compression processing for the image having been subjected to the image correction processing while relatively decreasing a compression ratio of the correction region and relatively increasing a compression ratio of an out-of-correction region of the image, which is a region different from the correction region,
the server-side communication processor transmits the image having been subjected to the compression processing to the video display apparatus,
the apparatus-side communication processor receives the image having been subjected to the compression processing, and
the video decompression processor performs decompression processing for the received image having been subjected to the compression processing.

12. The video display system according to claim 11,
wherein the server receives an input of stereoscopic image data as the video signal, and
the image processor performs processing of converting at least one of a size and an angle of the stereoscopic image data based on the viewer position information, and sets the correction region for the converted stereoscopic image data.

13. A video display method that receives an input of a video input signal and that displays a video based on the video input signal, implemented in a system including a server and a video display apparatus, the method comprising:
detecting, by the video display apparatus, a positional relation between a display screen on which the video is displayed and a viewer who watches the video;
generating, by the video display apparatus, viewer position information including a result of the detection;
transmitting, by the video display apparatus, the viewer position information to the server;
setting, by the server, based on the viewer position information, a correction region for an image based on the video input signal;
executing, by the server, image correction processing for the correction region;
performing, by the server, compression processing for the image having been subjected to the image correction processing while relatively decreasing a compression ratio of the correction region and relatively increasing a compression ratio of an out-of-correction region of the image, which is a region different from the correction region;

transmitting, by the server, the image having been subjected to the compression processing to the video display apparatus;

performing decompression, by the video display apparatus, for the received image having been subjected to the compression processing; and displaying, on the display screen, the video based on the video input signal associated with the image having been subjected to the image correction processing.

\* \* \* \* \*